(12) United States Patent
Murthy et al.

(10) Patent No.: US 12,401,642 B2
(45) Date of Patent: Aug. 26, 2025

(54) USER DEFINED NETWORK ACCESS THAT SUPPORTS ADDRESS ROTATION

(71) Applicant: Cisco Technology, Inc., San Jose, CA (US)

(72) Inventors: Shree N. Murthy, San Jose, CA (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 17/856,192

(22) Filed: Jul. 1, 2022

(65) Prior Publication Data

US 2024/0007468 A1 Jan. 4, 2024

(51) Int. Cl.
*H04L 29/06* (2006.01)
*H04L 9/40* (2022.01)
*H04L 61/2596* (2022.01)

(52) U.S. Cl.
CPC ...... *H04L 63/0876* (2013.01); *H04L 61/2596* (2013.01); *H04L 63/10* (2013.01)

(58) Field of Classification Search
CPC . H04L 63/0876; H04L 61/2596; H04L 63/10; H04L 61/5014; H04L 61/5038; H04L 61/5076; H04L 61/5092; H04L 2101/622; H04L 61/3015; H04L 61/302; H04L 65/1073; H04L 63/00; H04L 63/205; H04L 65/103; H04L 65/104; H04L 65/1095; H04L 2012/6443; H04L 2101/30;

(Continued)

(56) References Cited

U.S. PATENT DOCUMENTS 11,246,011 B1 2/2022 Satyanarayana et al.
2017/0195318 A1* 7/2017 Liu ........................ H04L 67/562
(Continued)

FOREIGN PATENT DOCUMENTS

WO 2021023376 A1 2/2021

OTHER PUBLICATIONS

"Randomized and Changing MAC Deployment Guide, " Cisco, https://www.cisco.com/c/en/us/products/collateral/wireless/randomized-changing-mac-dg.html, retrieved Mar. 4, 2022, 62 pages.
"User Defined Network," Cisco, Prescriptive Deployment Guide, Apr. 2021, 109 pages.
"Cisco User Defined Network: Network Administrator Experience White Paper," Cisco, Updated Feb. 10, 2021, 8 pages; https://www.cisco.com/c/en/us/solutions/collateral/enterprise-networks/white-paper-c11-744316.html.
(Continued)

*Primary Examiner* — Joseph P Hirl
*Assistant Examiner* — Leynna Truvan
(74) *Attorney, Agent, or Firm* — Edell, Shapiro & Finnan, LLC (57) ABSTRACT

Methods are provided that support media access control (MAC) address rotation (RCM) by generating a passcode for associating a user defined network by one or more endpoint devices instead of using MAC addresses for their respective device identity. In these methods, a computing device obtains a registration request for establishing a user defined network (UDN) and generates a unique UDN identifier and a unique passcode associated with the unique UDN identifier. The unique passcode enables an authentication of one or more endpoint devices to connect to the UDN. The authentication is independent of the MAC address of a respective endpoint device. The computing device provides the UDN identifier and the unique passcode such that the UDN identifier and the unique passcode are for connecting the one or more endpoint devices to the UDN.

20 Claims, 7 Drawing Sheets

(58) Field of Classification Search
CPC .......... H04L 2101/60; H04L 2101/618; H04L 43/065; H04W 8/06; H04N 21/42684; H04M 7/0063; G10H 2240/111; G06F 3/1286; G05B 2219/24162; G05B 19/41855; G05B 2219/25022; G05B 2219/31335; G07C 9/23; G07B 2017/00774; G11B 2219/00152; G11B 20/00195; G11B 20/00717; H04J 11/0069
See application file for complete search history.

(56) References Cited

U.S. PATENT DOCUMENTS

| | | |
|---|---|---|
| 2020/0396604 A1 | 12/2020 | Olshansky et al. |
| 2021/0099876 A1 | 4/2021 | Neipris et al. |
| 2021/0286868 A1* | 9/2021 | Kragh .................. H04L 9/3247 |
| 2022/0070172 A1 | 3/2022 | Muthusamy et al. |
| 2023/0397007 A1 | 12/2023 | Wifvesson et al. |
| 2024/0007468 A1 | 1/2024 | Murthy et al. |

OTHER PUBLICATIONS

Aboba B., et al., "Extensible Authentication Protocol (EAP)," Network Working Group, Request for Comments: 3748, Obsoletes: 2284, Category: Standards Track, Jun. 2004, pp. 1-67.
Cisco: "802.11 Network Security Fundamentals", Chapter 1, Cisco Secure Services Client Administrator Guide, Release 5.1.0, Jul. 7, 2008, pp. 1-14.
Congdon P., et al., "IEEE 802.1X Remote Authentication Dial In User Service (Radius) Usage Guidelines", Network Working Group, Request for Comments: 3580, Sep. 2003, pp. 1-30.
Moore T., "Use of EAPOL-Key Messages", doc.: IEEE 802.11-04/534r0, May 2004, pp. 1-6.
Ohba Y., et al., "An EAP Method for Key Distribution Exchange for Handover Re-authentication", draft-ohba-eap-kde-01, Feb. 22, 2008, pp. 1-11.
Venkateswaran R.T., et al., "Agentless Quarantine of Network Endpoints", Technical Disclosure Commons, Defensive Publications Series, Apr. 2022, pp. 1-6.

* cited by examiner

USER DEFINED NETWORK ACCESS THAT SUPPORTS ADDRESS ROTATION

TECHNICAL FIELD

The present disclosure generally relates to data and communication networks.

BACKGROUND

When sharing a network by multiple users, network segmentation may be used for security and enhanced control of the user devices. For example, a User Defined Network (UDN) allows the users to create their own personal network (a network segment) that would include only their devices. The user may invite other trusted users into their personal network, sometimes referred to as a private room. This provides the user with security and ability to control the sharing of their devices. The user registers their devices to the private room by inputting a Media Access Control (MAC) address of the respective device, which is then associated with the personal network. In the UDN, communication is allowed only between the registered devices.

DESCRIPTION OF EXAMPLE EMBODIMENTS

Overview

A mechanism is presented herein that supports media access control (MAC) address rotation (RCM) by generating a passcode for accessing a user defined network by one or more endpoint devices instead of using MAC addresses for their respective device identity.

In one form, a computing device, obtains a registration request for establishing a user defined network (UDN) and generates a UDN identifier and a unique passcode associated with the UDN identifier. The unique passcode enables an authentication of one or more endpoint devices to connect to the UDN. The authentication is independent of a media access control (MAC) address of a respective endpoint device. The computing device provides the UDN identifier and the unique passcode such that the UDN identifier and the unique passcode are provided to the one or more endpoint devices to connect to the UDN.

In another form, a network device, obtains, from an endpoint device, a unique passcode associated with a user defined network (UDN). The network device establishes a connection for the endpoint device to a communication network. The UDN is a portion of the communication network segmented for a user of the endpoint device. The network device generates a hash of the unique passcode and provides the hash, to an authentication server. The authentication server authenticates the endpoint device onto the UDN based on the hash without using a media access control (MAC) address of the endpoint device. The network device further obtains, from the authentication server, a UDN identifier associated with the hash and connects the endpoint device to the UDN based on the UDN identifier.

EXAMPLE EMBODIMENTS

The UDN uses MAC address of the respective device as a unique device identifier. For example, the user logs into a mobile application, a web portal, or other mechanism (referred to as a UDN client portal), using credentials provided by an enterprise network (referred to as a shared communication network). The user may then manually input MAC address of their devices and invite other users to be a part of their private network segment. A UDN cloud service then assigns the registered devices of the user to their personal network and stores the MAC addresses with the unique identity of the private network segment (referred to as a UDN identifier (UDN-ID)).

Network devices such as a wireless local access network (LAN) controller (WLC) and access points (APs), use the UDN-ID to enforce traffic containment for the traffic generated by the registered endpoint devices. By performing MAC address filtering, traffic containment policies are enforced. For example, unicast traffic between two different personal networks is blocked.

The UDN functions are based on the uniqueness of the MAC address for the respective endpoint device. Rotating/randomized changing of the MAC addresses (RCM) support on the endpoint devices creates challenges for the UDN functions because the uniqueness of the MAC address as an identity of the device is lost. In other words, each time a MAC address rotation occurs (an RCM event), the endpoint device needs to be re-authenticated onto the UDN.

Further, some operating systems of the endpoint devices disable applications from fetching the MAC address through an application programming interface (API). As such, using the MAC address as the unique identity of the endpoint device is becoming increasingly more difficult.

In one or more example embodiments, techniques are provided in which a unique passcode is generated and is associated with the UDN-ID. The unique passcode is used by various endpoint devices instead of their MAC address. In these techniques, a unique passcode is generated per UDN-ID and is used for authenticating user's endpoint devices onto a personal network segment (UDN) irrespective of their MAC addresses and/or MAC addresses changes. These techniques are also applicable to endpoint devices that use pre-shared key (PSK), identity PSK (iPSK), simultaneous authentication of equals (SAE) based authentication in the UDN. These techniques adapt to the changing MAC addresses of the endpoint devices when the respective endpoint device on-boards onto a network in the context of the UDN using a PSK based authentication mechanism. Because the unique passcode is assigned to each private room in addition to the UDN-ID, unique identity of the respective endpoint device is no longer needed for authenticating the endpoint device onto the UDN.

While example embodiments describe generating one UDN (private room, personal network, etc.), it is understood that a number of UDNs and private rooms being generated are not limited to one and may vary based on a particular deployment of the network and use case scenario.

Figure 1:
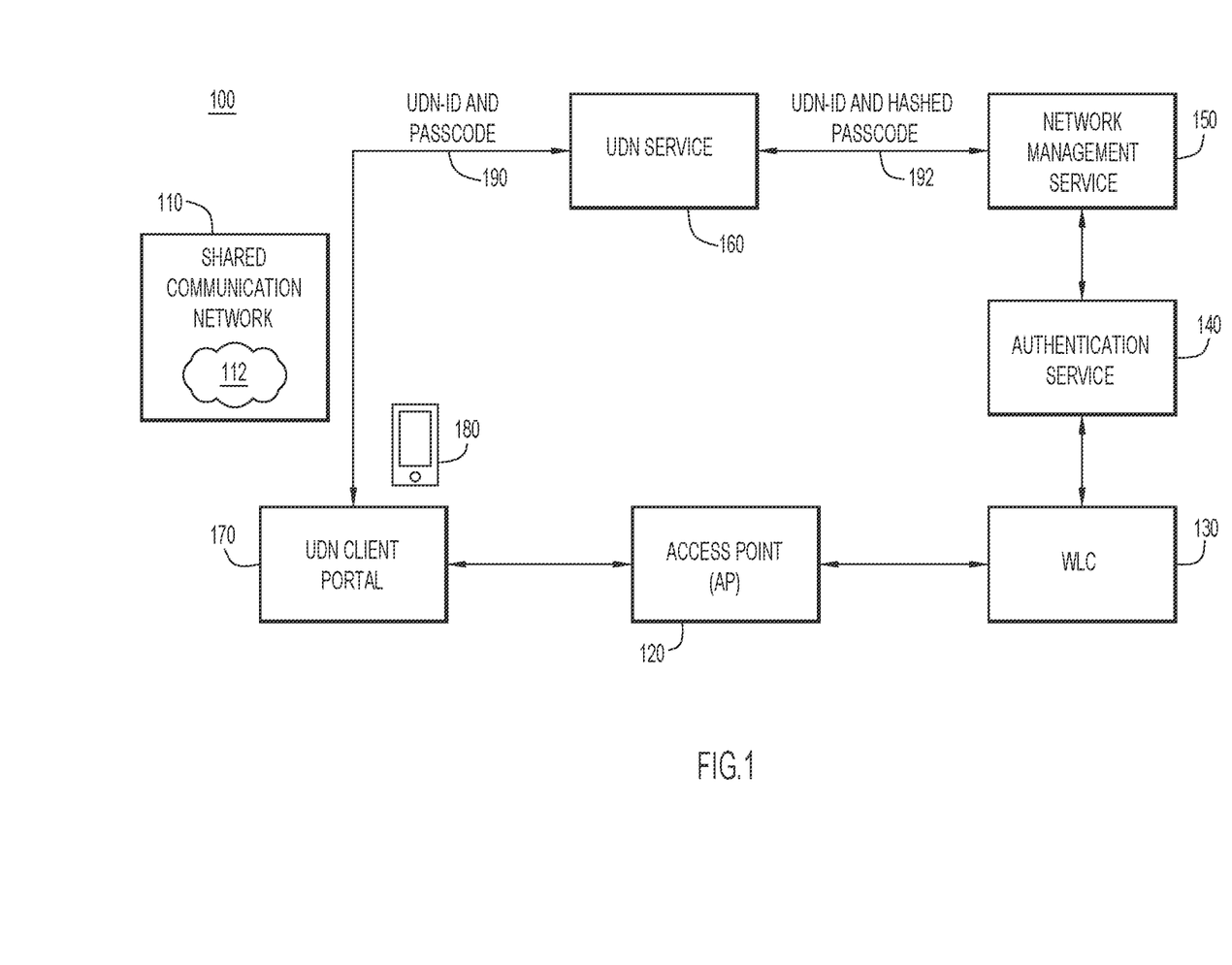
FIG. 1 is a block diagram illustrating a system configured to authenticate one or more endpoint devices onto the UDN using a unique passcode, according to an example embodiment.

FIG. 1 is a block diagram illustrating a system 100 configured to authenticate one or more endpoint devices onto the UDN using a unique passcode, according to an example embodiment.

The system 100 includes a shared communication network 110, one or more access points depicted as an access point (AP) 120, wireless local area network (LAN) controller (WLC) 130, an authentication service 140, a network management service 150, a UDN service 160, a UDN client portal 170 that communicates with one or more endpoint devices that are depicted as an endpoint device 180.

This is only an example of the system 100, and the number and types of entities may vary based on a particular deployment and use case scenario, such as the type of service being provided and network structures. For example, while the system 100 includes the AP 120, other network devices may be present in the system 100. The network devices may include, but are not limited to switches, virtual routers, leaf nodes, spine nodes, etc.

In various example embodiments, the entities of the system 100 (endpoint device 180, UDN service 160, network management service 150, authentication service 140, the WLC 130, and the AP 120) may each include a network interface, at least one processor, and a memory. Each entity may be an apparatus or any programmable electronic device capable of executing computer readable program instructions. The network interface may include one or more network interface cards (having one or more ports) that enable components of the entity to send and receive packets or data over the network(s), such as a local area network (LAN) or a wide area network (WAN), and/or wireless access networks such as the shared communication network 110. Each entity may include internal and external hardware components such as those depicted and described in further detail in FIG. 7. In one example, at least some of these entities may be embodied as virtual devices with functionality distributed over a number of hardware devices, such as virtual APs, switches, routers, servers, etc.

The endpoint device 180 is any suitable device configured to initiate a flow in the system 100, such as data source device and/or data sink device. For example, the endpoint device 180 may include a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the system 100. The endpoint device 180 may also include any suitable interface to a human user such as a microphone, a display, a keyboard, or other terminal equipment. The endpoint device 180 may be configured with appropriate hardware (e.g., processor(s), memory element(s), antennas and/or antenna arrays, baseband processors (modems), and/or the like such as those depicted and described in further detail in FIG. 7), software, logic, and/or the like to facilitate respective Over-the-Air (OTA) interfaces for accessing/connecting to the AP 120 and sending or receiving packets.

The endpoint device 180 is configured to connect the user to the UDN client portal 170 such as a mobile application executing on the endpoint device 180 or a web portal accessible via the endpoint device 180. Using the UDN client portal 170, the user registers one or more of their endpoint devices for the UDN 112 (private room) and invites other users to join the private room, as detailed below.

To onboard onto the shared communication network 110, the endpoint device 180 is connected to (establishes an association with) the AP 120. The endpoint device 180 and the AP 120 may represent a wireless infrastructure that provides Wireless Local Area Network (WLAN) coverage for a specific geographic area/location. For example, wireless infrastructure may serve an airport, a shopping mall, a train station, a venue, etc. The endpoint device 180 and the AP 120 may use various wireless access network protocols, such as the WiFi® wireless technology, to send and receive various packets. In one example, the endpoint device 180 may be configured to connect to a WLAN (e.g., through the AP 120), and initially, may be part of the shared communication network 110 (e.g., a Wi-Fi® network offered in a corporate, enterprise, or dorm room environment).

The AP 120 may be WLAN APs configured with appropriate hardware (e.g., processor(s), memory element(s), antennas and/or antenna arrays, baseband processors (modems), and/or the like), software, logic, and/or the like to provide OTA coverage for a WLAN access network (e.g., Wi-Fi®). In various example embodiments, the AP 120 may be implemented as Wi-Fi access point (AP) and/or the like. The AP 120 may be configured with appropriate hardware (e.g., processor(s), memory element(s), antennas and/or antenna arrays, baseband processors (modems), and/or the like), software, logic, and/or the like to facilitate respective OTA interfaces for accessing/connecting to the endpoint device 180 (to send and receive packets) and for communicating with the network management service 150 (to send and receive packets) and the UDN service 160. The AP 120 may be managed or controlled by the network management service 150 and/or the WLC 130. The AP 120 is connected to the WLC 130 via the LAN/WAN to send and receive data or packets.

The WLC 130 may be a control plane entity that provides or is responsible for WLAN functions such as WLAN-based access authentication services, authorization services, intrusion prevention, Radio Frequency (RF) management, and/or the like to facilitate the endpoint device 180 connectivity via the AP 120. In one form, the WLC 130 may be a software process running on one or more servers in a cloud (on any server in a datacenter or at any location with Internet connectivity). The WLC 130 is configured with appropriate hardware (e.g., processor(s), memory element(s), and/or the like such as those depicted and described in further detail in FIG. 7), software, logic, and/or the like.

The AP 120 and the WLC 130 are network devices that enable traffic containment within the UDN 112 using a UDN-ID and an associated unique passcode. The UDN 112 is a personal, secure network, a private network, a network segment dedicated to the user, or a private room within the shared communication network 110. The user may create the UDN 112 and add the endpoint devices (e.g., the endpoint device 180) thereto using the UDN client portal 170, such as a mobile application downloadable to the endpoint device 180. The UDN client portal 170 may cause the endpoint device 180 to scan the shared communication network 110 for shareable endpoint devices and display an indication of such endpoint devices in a form of a list, for example. The user selects the one or more endpoint devices to add to UDN 112. Hence, the UDN 112 includes the registered devices of the user.

Further, the AP 120 and/or the WLC 130 may perform MAC address rotation for the endpoint device 180, at a preset time interval (each epoch), and/or for each endpoint device 180 associated with it (respective S SID). In one form, the MAC address rotation may be performed at a request of the endpoint device 180 and/or at the direction of the network management service 150. MAC address rotation involves assigning one or more new MAC addresses to the respective endpoint device 180. The MAC address rotation is performed by the end-point device 180 itself but may be initiated by the AP 120 and/or WLC 130.

In one or more example embodiments, the WLC 130 communicates with an authentication service 140 to perform authentication of the endpoint device 180. The WLC facilitates and controls connectivity of the endpoint device 180 via the AP 120. The authentication service 140, embodied by one or more hardware computing devices, may include at least part of one or more of a digital network architecture, identity services engine (ISE), Policy Control Function (PCF), an authentication, authorization, and accounting (AAA) service, etc. The authentication service 140 communicates with the network management service 150 to authenticate the user onto the shared communication network 110 i.e., the UDN 112 of the shared communication network 110.

The network management service 150 may be a management device(s) or software process associated with wireless infrastructure. In one form, the network management service 150 may be an on-premise device(s) that connects with the UDN service 160 to provision the shared communication network 110 and to provide visibility through telemetry and assurance data. In another form, the network management service 150 may be a software process running on one or more servers in a cloud (on any server in a datacenter or at any location with Internet connectivity). The network management service 150 is configured with appropriate hardware (e.g., processor(s), memory element(s), and/or the like such as those depicted and described in further detail in FIG. 7), software, logic, and/or the like.

The network management service 150 communicates with the UDN service 160 and the authentication service 140 to register the endpoint device 180 onto the UDN 112 and/or to onboard the endpoint device 180 onto the shared communication network 110. In one example, the network management service 150 may communicate directly with the WLC 130 using a Remote Authentication Dial-In User Service (RADIUS) network protocol. While the authentication service 140 and the network management service 150 are depicted as separate entities, in one or more example embodiments, these entities may be embodied into an integrated service.

The UDN service 160 renders the endpoint device 180 undiscoverable to other endpoint devices that are outside the UDN 112 as defined by the UDN-ID. This may be useful for protecting the security of the endpoint device 180. The user selects one or more endpoint devices such as the endpoint device 180 to add to the UDN 112. The UDN service 160 generates the UDN-ID and the unique passcode and at 190, provides the UDN-ID and passcode to the UDN client portal 170, which then disseminates the UDN-ID and passcode to the registered endpoint devices. In other words, the UDN client portal provisions the registered endpoint devices using a device provisioning protocol to connect to the UDN.

The UDN service 160 is further configured to generate a hash of the passcode. At 192, the UDN-ID and the hashed passcode are provided to the network management service 150. The network management service 150 is configured to communicate with the authentication service 140 and optionally, the WLC 130 to provide the information about the UDN 112 (the UDN-ID and the hashed passcode). Instead of the MAC addresses being used as an identification of the registered endpoint devices, the passcode is used as the identity of the endpoint devices i.e., to indicate that these endpoint devices are members of the UDN 112, as explained in further detail below.

Figure 2:
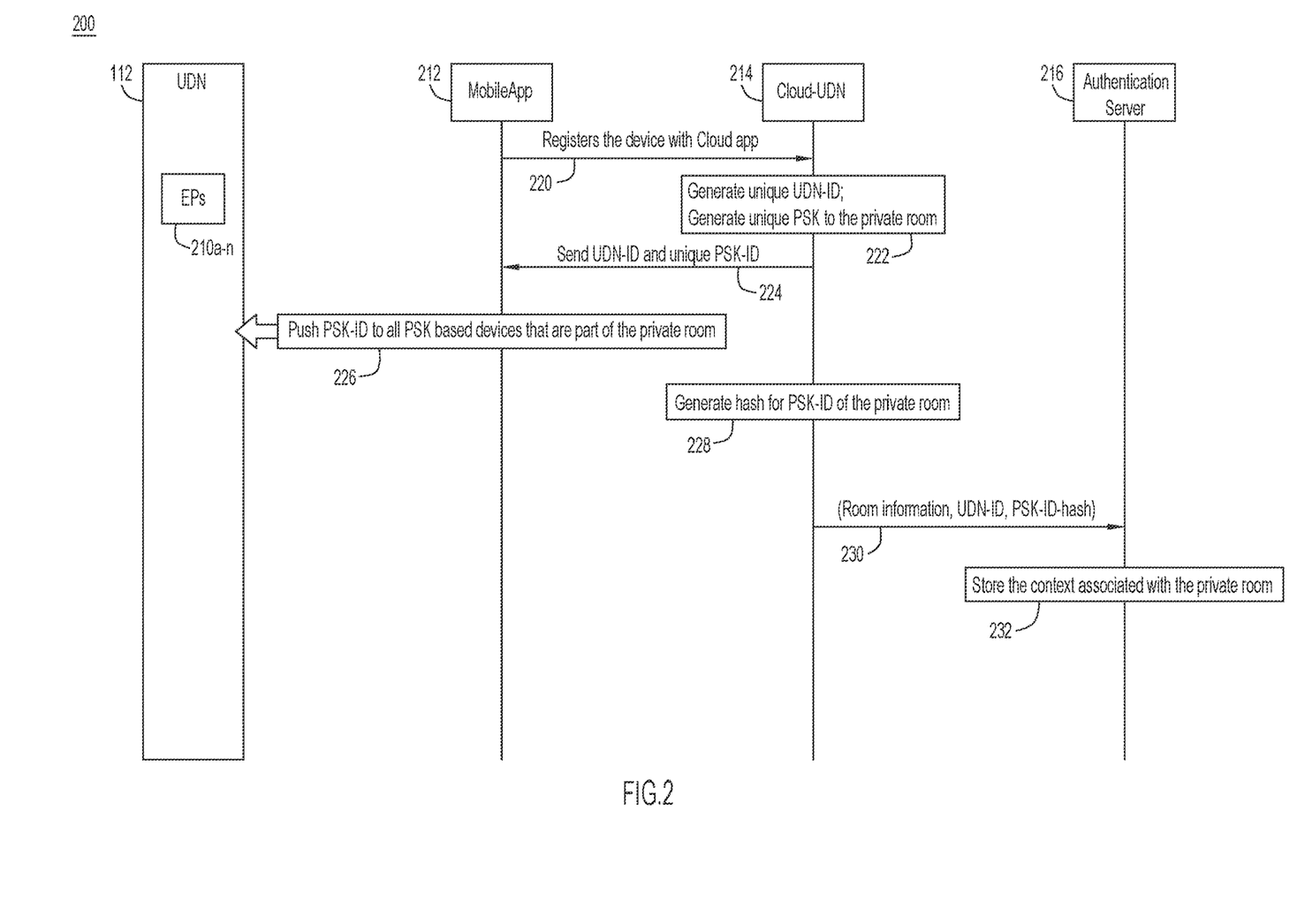
FIG. 2 is a flow diagram illustrating a UDN registration process, according to an example embodiment.
Figure 3:
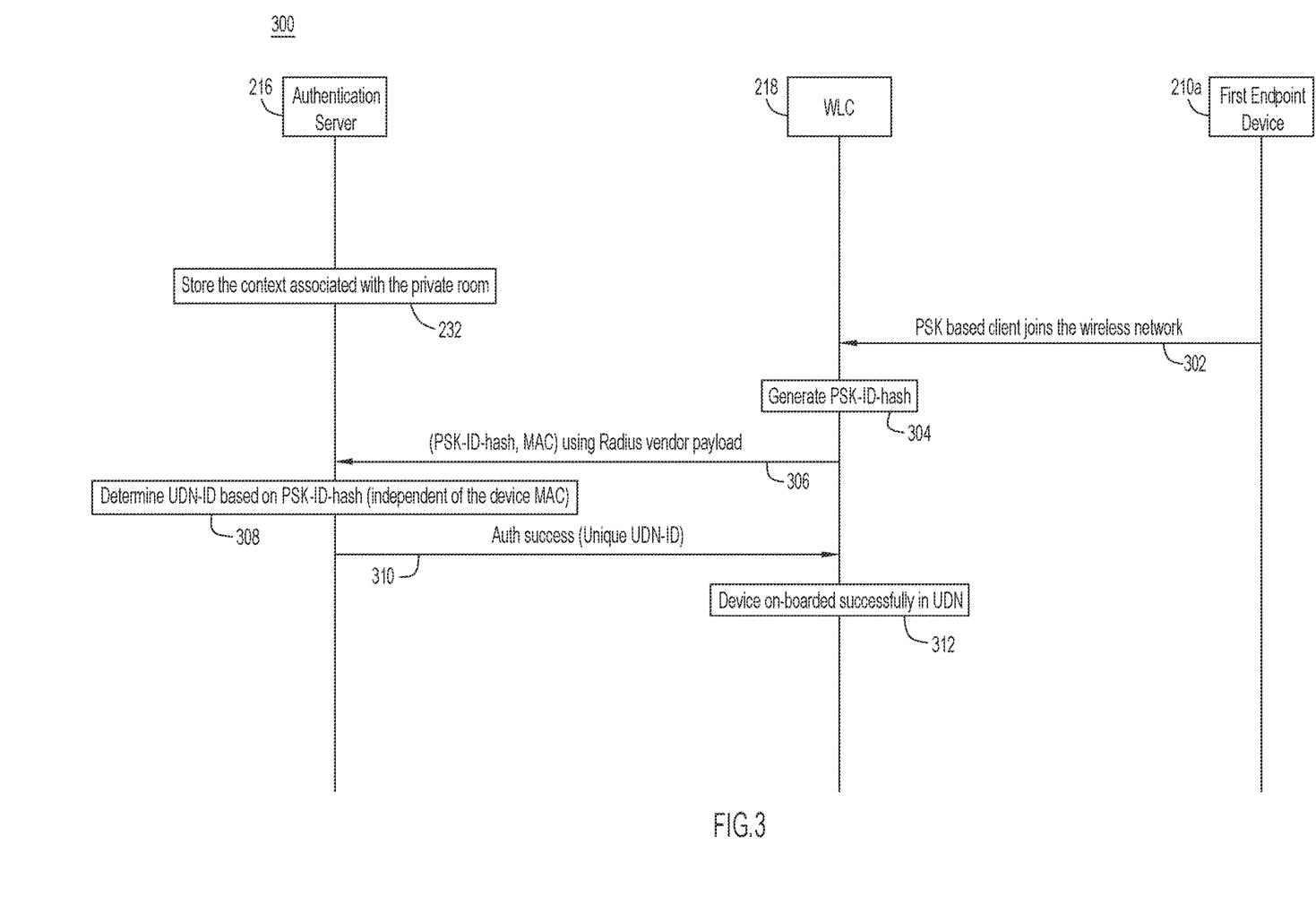
FIG. 3 is a flow diagram illustrating a process of onboarding an endpoint device onto a UDN network, according to an example embodiment.
Figure 4:
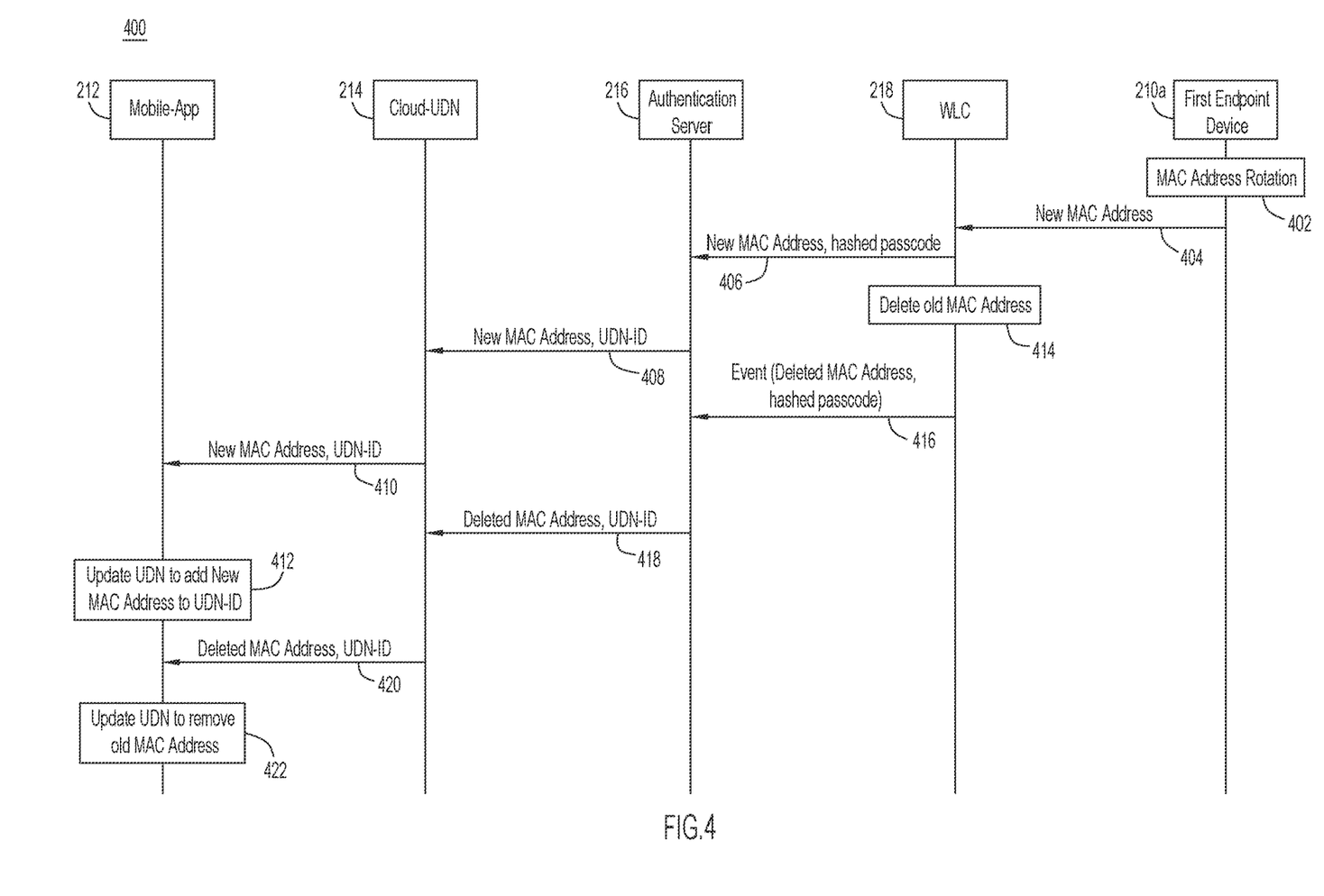
FIG. 4 is a flow diagram illustrating a process of updating UDN information at a UDN client portal based on a MAC address rotation, according to an example embodiment.

With continued reference to FIG. 1, reference is now made to FIGS. 2-4, which illustrate various UDN processes, according to one or more example embodiments. The UDN processes involve various network entities. For example, various network entities include one or more endpoint devices 210a-n (EPs 210a-n) that are registered for the UDN 112 of FIG. 1. The network entities further include a mobile application (mobile app) 212, which is an example of the UDN client portal 170 of FIG. 1 and a cloud-UDN 214, which is an example of the UDN service 160 of FIG. 1. The network entities further include an authentication server 216. The authentication server 216 is an example of integrated network management service 150 and authentication service 140. The network entities further include the WLC 218 such as the WLC 130 of FIG. 1.

The notation "a-n" denotes that a number is not limited, can vary widely, and depends on a particular use case scenario, and need not be the same, in number, for the endpoint devices, APs, etc.

Specifically, FIG. 2 is a flow diagram illustrating a UDN registration process 200 in which a unique passcode is generated for each private room in addition to the unique UDN-ID, according to an example embodiment.

The UDN registration process 200 involves at 220, the mobile app 212 registers the device (one of the EPs 210a-n) for the UDN 112. Specifically, the device on which the mobile app 212 is executing, sends a registration request to the cloud-UDN 214.

At 222, the cloud-UDN 214 generates a unique UDN-ID for the UDN 112 and a unique passcode that is associated with the private room (the UDN 112). The unique passcode is a unique value that is associated with and linked to the UDN-ID. As such, all EPs 210a-n that are to be part of the UDN 112 use this unique passcode (instead of their MAC addresses) to join the UDN 112. The passcode enables the EPs 210a-n to join the UDN 112 regardless of their MAC addresses and/or MAC address changes. The unique passcode may be a passphrase or a pre-shared key (PSK). The passphrase and/or the PSK is generated as a function of the UDN-ID e.g., function (UDN-ID). The passcode is a unique string of characters that may be used to generate encryption keys. In other words, while the MAC address is included in the packet, the MAC address is not used for an assignment of an EP to the UDN 112. In one example embodiment, when the UDN-ID is generated, the UDN-ID is used as input to a function to generate the passcode.

At 224, the generated UDN information is pushed from the cloud-UDN 214 to the mobile app 212. The UDN information includes the generated UDN-ID and unique passcode.

At 226, the mobile app 212 pushes the generated passcode (passphrase or PSK) to the EPs 210a-n using various mechanisms such as a device provisioning protocol (DPP). For example, PSK-ID (one example of the passcode) is provided to PSK-based endpoint devices that are to be part of the private room/the UDN 112. That is, the mobile app 212 provisions the EPs 210*a-n* to connect to the UDN 112. The UDN 112 is a portion of the common communication network segmented for the user.

Additionally, at 228, the cloud-UDN 214 hashes the unique passcode of the private room/the UDN 112. For example, the cloud-UDN 214 generates a hash over the auto-generated PSK-ID for each private room or generates a hash from the UDN-ID and PSK-ID binding. At 230, the cloud-UDN 214 communicates UDN information to the authentication server 216. For example, the UDN information includes a hash of the PSK-ID, the UDN-ID, and other information for the private room/the UDN 112. The other information may include user related information (user profile). At 232, the authentication server 216 stores the UDN-ID and the hash of the unique passcode (e.g., the PSK-hash) for the private room/the UDN 112 in its datastore. The UDN-ID and the hash are stored in association with one another along with other information about the UDN 112 such as traffic constraint policies, user profile, etc.

When a user wans to invite another trusted user to join the UDN 112, the user, using the mobile app 212, generates an invitation to join for the other trusted user. The other trusted user obtains the invitation via the cloud-UDN 214. If the trusted user accepts the invitation, the cloud-UDN 214 pushes the unique passcode (PSK-ID) to the endpoint device of the trusted user. The endpoint device of the trusted user then connects to the UDN using the unique passcode, as described below.

FIG. 3 is a flow diagram illustrating a process 300 of onboarding a first endpoint device 210*a* onto a UDN, according to an example embodiment. The first endpoint device 210*a* may be a device of the user that is executing the mobile app 212, may be another endpoint device of the user, or may be an endpoint device of the trusted user that was invited to join the UDN.

The onboarding process 300 includes at 302, the first endpoint device 210*a* joining a wireless network. In one example, the first endpoint device 210*a* is PSK enabled client device and the wireless network is an example of the shared communication network 110 of FIG. 1 such as a WiFi® network offered in a corporate enterprise or shared environment (dorm room environment, multi-dwelling building units, etc.). The AP 120 of FIG. 1 and/or the WLC 218 may use the MAC address of the first endpoint device 210*a* to authenticate the first endpoint device 210*a* onto the common wireless network. The first endpoint device 210*a* further uses the unique passcode such as the auto-generated PSK, to join the UDN 112 of FIGS. 1 and 2 of the common wireless network.

Specifically, in response to receiving the unique passcode from the first endpoint device 210*a* (via the AP 120 of FIG. 1), at 304, the WLC 218 generates a hash of the unique passcode. That is, the WLC 218 generates a PSK-hash using the same algorithm that is used by the cloud-UDN 214 at 228 of FIG. 2. At 306, the WLC 218 sends the generated hash, as a vendor payload in the RADIUS message, for example, to the authentication server 216 along with the MAC address of the first endpoint device 210*a*.

The authentication server 216 authenticates the first endpoint device 210*a*. At 308, based on the PSK-hash, the authentication server 216 further determines the UDN-ID that corresponds the PSK-hash (independent of the MAC address). That is, the authentication server 216 compares the PSK-hash with hashes stored in its datastore/database to find a match. If a match is found, the authentication server 216 retrieves a corresponding UDN-ID that is mapped to the PSK-hash. In other words, regardless of the MAC address of the first endpoint device 210*a* (even after the MAC address of the first endpoint device 210*a* is rotated), the authentication server 216 determines the UDN-ID that is associated with the PSK-hash. At 310, in response to a successful authentication of the first endpoint device 210*a*, the authentication server 216 transmits to the WLC 218, an authentication success message that includes the UDN-ID along with other attributes. The authentication success message is provided using defined RADIUS attributes, for example.

In one example, the WLC 218 and the authentication server 216 communicate with each other using the RADIUS protocol. The WLC 218 generates RADIUS request messages with information required for an authentication of the user and/or the first endpoint device 210*a*. The information may be provided in the vendor payload. The authentication server 216 provides RADIUS responses that include the UDN identifier as one of a plurality of pre-defined RADIUS attributes.

At 312, the WLC 218 successfully onboards the first endpoint device 210*a* and enforces required traffic containment on the first endpoint device 210*a*. That is, the WLC 218 puts the first endpoint device 210*a* into the private room based on the UDN-ID. The WLC 218 then applies one or more traffic constraint policies associated with the UDN on one or more network packets obtained for the first endpoint device 210*a*.

FIG. 4 is a flow diagram illustrating a process 400 of updating UDN information at a UDN client portal based on a MAC address rotation, according to an example embodiment.

At 402, the first endpoint device 210*a* joins another SSID or rotates the MAC address. The new MAC address is then on-boarded onto the common wireless network. Specifically, at 404, the new MAC address is propagated from the first endpoint device 210*a* to the WLC 218. The WLC 218 updates its records and associates the new MAC address with the common wireless network. Additionally, the WLC 218 generates a hash of the passcode associated with the private room of the first endpoint device 210*a* and at 406, the WLC 218 provides the new MAC address and the hashed passcode to the authentication server 216. The authentication server 216 sends access-accept to the WLC 218 to on-board the first endpoint device 210*a*.

The authentication server 216 determines the UDN-ID that is associated with the hashed passcode and at 408, the new MAC address along with the retrieved UDN-ID is propagated from the authentication server 216 to the cloud-UDN 214. At 410, the new MAC address along with the UDN-ID is propagated from the cloud-UDN 214 to the mobile app 212. At 412, the mobile app 212 adds the new MAC address to the private room identified by the UDN-ID. The mobile app 212 may further show or display the new MAC address that has joined the private room.

To ensure that the old MAC address is removed from the private room/the UDN (after the MAC address has been rotated), various mechanisms may be used such as a Dynamic Host Configuration Protocol (DHCP) scavenger timers.

For example, at 414, the WLC 218 deletes the old MAC address in response to MAC address rotation and/or after an idle time period. In response thereto, at 416, MAC address event is generated and provided to the authentication server 216. That is, the event includes the deleted MAC address and a corresponding hashed passcode. The authentication server 216 determines the UDN-ID based on the hashed passcode and at 418, notifies the cloud-UDN 214 of the deleted MAC address associated with the UDN-ID. At 420, the cloud-UDN 214 provides the deleted MAC address with the UDN-ID to the mobile app 212. At 422, the mobile app 212 removes the corresponding entry from the private room/UDN i.e., the old MAC address is removed from the UDN. That is, the mobile app 212 updates the MAC address information by adding new MAC address of the first endpoint device 210*a* and deleting the old MAC address of the first endpoint device 210*a*.

MAC address information is propagated from the WLC 218 to the mobile app 212 such that MAC addresses of the endpoint devices are managed by the mobile app 212 and are not required by the cloud-UDN 214. That is, any RCM methods coupled with a PSK based authenticated endpoint device are supported using the passcode instead of the MAC address authentication. Additionally, when an endpoint device joins another UDN enabled SSID after the initial on-boarding, the MAC address is not needed, and a sharable passcode is used instead. In other words, the endpoint device need not re-authenticate onto the UDN with the new MAC address and may skip the secondary authentication. Even if the MAC address has changed, the endpoint device remains connected to the UDN. Since UDN authentication is independent of the identity of the endpoint device, re-association with the UDN is no longer needed.

RCM and the lack of stable identifiers creates challenges with establishing policies for PSK networks. However, the technique presented herein use the UDN-ID to generate a unique passcode per UDN-ID that enables an authentication of the endpoint devices with the network irrespective of their identities (e.g., MAC addresses). Rotating or randomizing identities of the endpoint devices does not influence their connections to the UDN.

Figure 5:
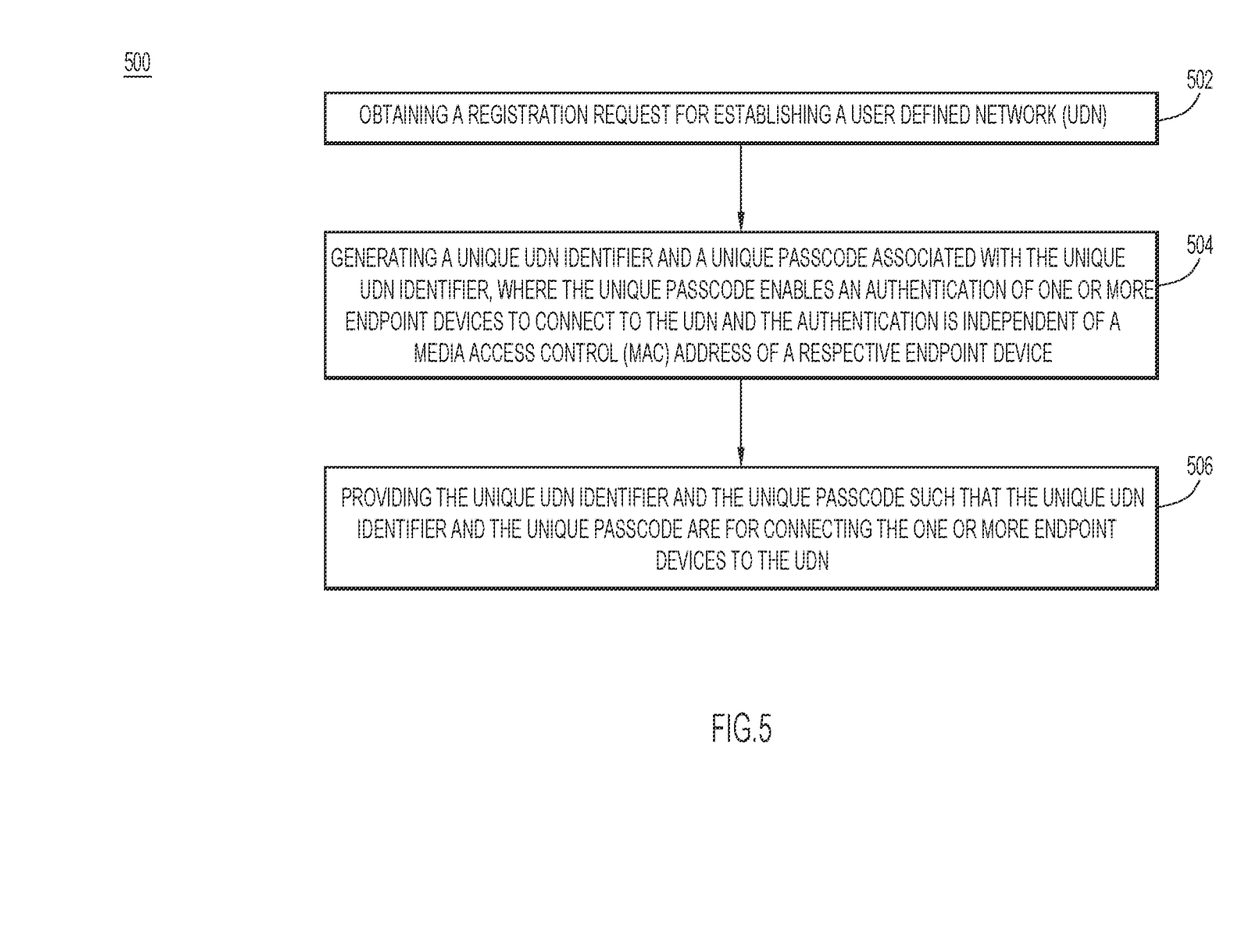
FIG. 5 is a flow diagram illustrating a method of generating a unique passcode that is used instead of a media access control (MAC) address to connect an endpoint device to the UDN, according to an example embodiment.

FIG. 5 is a flow diagram illustrating a method 500 of generating a unique passcode that is used instead of a MAC address to connect an endpoint device to the UDN, according to an example embodiment. The method 500 may be performed by a computing device such as one or more servers of the UDN service 160 of FIG. 1 or the cloud-UDN 214 of FIGS. 2 and 4.

The method 500 involves, at 502, obtaining a registration request for establishing a user defined network (UDN) and at 504, generating a UDN identifier and a unique passcode associated with the UDN identifier. The unique passcode enables an authentication of one or more endpoint devices to connect to the UDN. The authentication is independent of the MAC address of a respective endpoint device.

The method 500 further involves at 506, providing the UDN identifier and the unique passcode such that the UDN identifier and the unique passcode are provided to the one or more endpoint devices to connect to the UDN.

In one instance, the registration request, obtained at 502, may be obtained from a mobile application that is executing on the respective endpoint device of the one or more endpoint devices. Further, the UDN identifier and the unique passcode may be provided to the mobile application, which provisions the one or more endpoint devices using a device provisioning protocol to connect to the UDN using the UDN identifier and the unique passcode.

In one form, the method 500 may further involve obtaining, from an authentication server, a new MAC address of the respective endpoint device. The new MAC address may be generated based on performing a MAC address rotation. The method 500 may further involve providing, to the mobile application, the new MAC address and the UDN identifier such that the mobile application updates the MAC address of the respective endpoint device associated with the UDN.

In one or more example embodiments, the respective endpoint device may be authenticated to connect to the UDN using the unique passcode instead of the MAC address.

In one form, the method 500 may further involve generating a hash of the unique passcode and providing, to an authentication server, UDN information including the hash and the UDN identifier.

In one instance, the operation 504 of generating the unique passcode may involve generating a passphrase as a function of the UDN identifier.

In another instance, the operation 504 of generating the unique passcode may involve generating a pre-shared key as a function of the UDN identifier.

Figure 6:
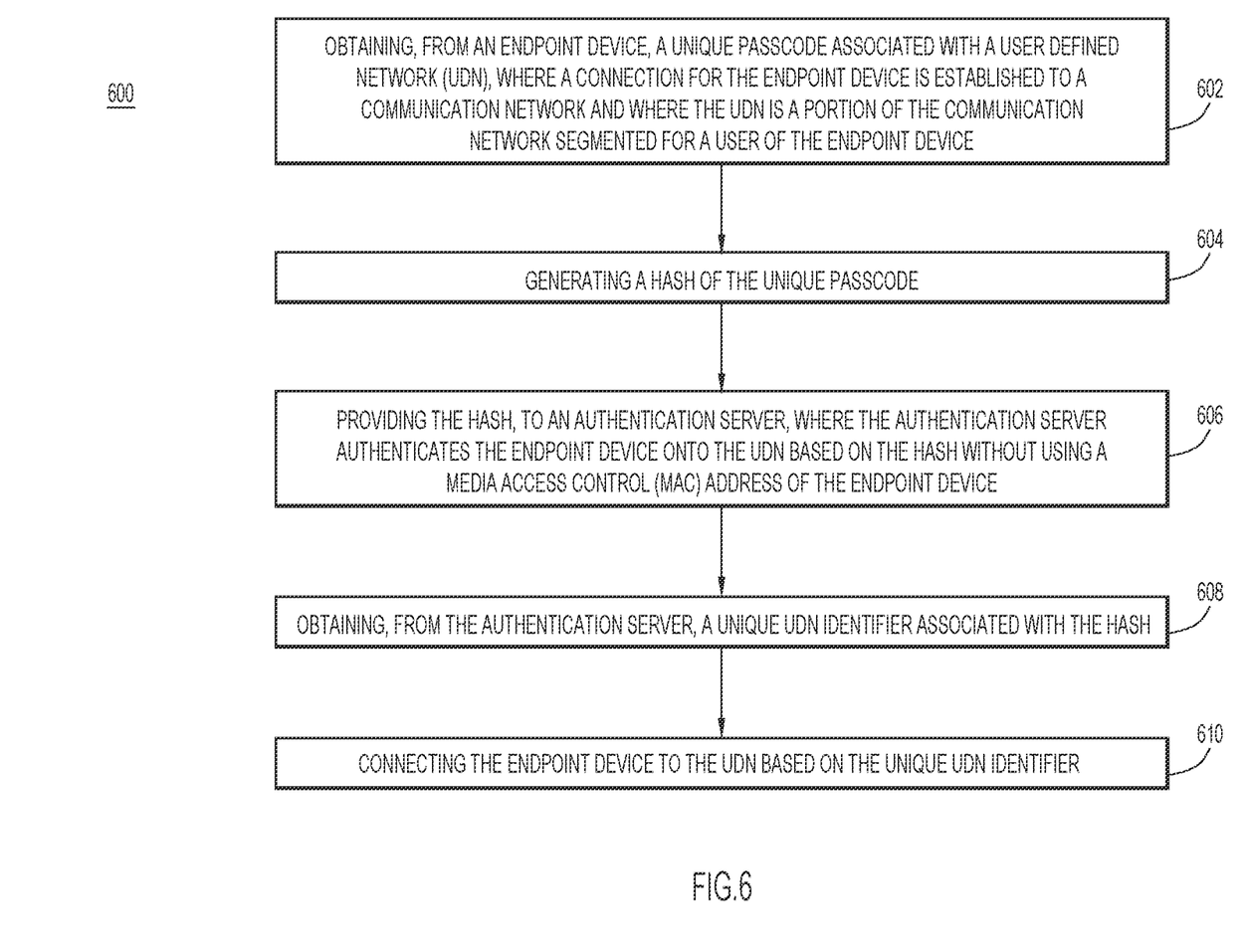
FIG. 6 is a flow diagram illustrating a method of connecting an endpoint device to the UDN based on a passcode provided by the endpoint device, according to an example embodiment.

FIG. 6 is a flowchart illustrating a method of 600 of connecting an endpoint device to the UDN based on a passcode provided by the endpoint device, according to an example embodiment. The method 600 may be performed by a network device, such as the WLC 130 of FIG. 1 or the WLC 218 of FIGS. 3 and 4.

The method 600 involves at 602, obtaining, from an endpoint device, a unique passcode associated with a user defined network (UDN). A connection for the endpoint device to a communication network is established and the UDN is a portion of the communication network segmented for a user of the endpoint device.

The method 600 further involves at 604, generating a hash of the unique passcode.

The method 600 further involves at 606, providing the hash to an authentication server. The authentication server authenticates the endpoint device onto the UDN based on the hash without using a media access control (MAC) address of the endpoint device.

The method 600 further involves at 608, obtaining, from the authentication server, a UDN identifier associated with the hash and at 610, connecting the endpoint device to the UDN based on the UDN identifier.

In one or more example embodiments, the unique passcode and the UDN identifier may be generated by a UDN service. The hash of the unique passcode is associated with the UDN identifier and is stored at the authentication server.

In one instance, the operation 606 of providing the hash may involve providing a Remote Authentication Dial-In User Service (RADIUS) message that includes the hash in a vendor payload.

In one form, the operation 608 of obtaining the UDN identifier may involve obtaining a RADIUS message having the UDN identifier as one of a plurality of pre-defined RADIUS attributes. The UDN identifier may be matched with the hash by the authentication server.

In one or more example embodiments, the operation 610 of connecting the endpoint device to the UDN may involve applying one or more traffic constraint policies associated with the UDN to one or more network packets obtained from the endpoint device.

In one instance, the unique passcode may be a passphrase generated as a function of the UDN identifier.

In another instance, the unique passcode may be a pre-shared key generated as a function of the UDN identifier.

Figure 7:
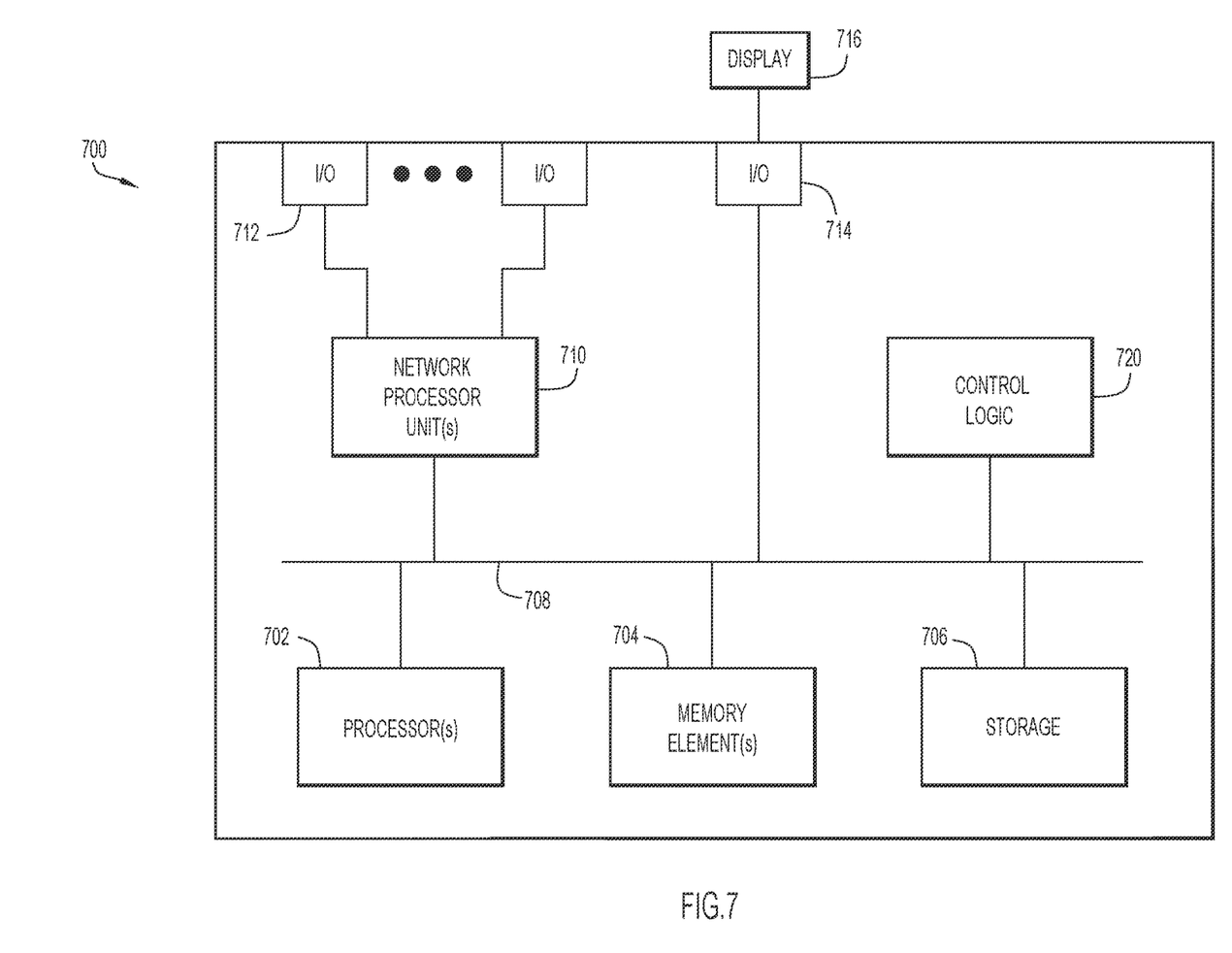
FIG. 7 is a hardware block diagram of a computing device that may perform functions associated with any combination of operations in connection with the techniques depicted and described in FIGS. 1-6, according to various example embodiments.

FIG. 7 is a hardware block diagram of a computing device 700 that may perform functions associated with any combination of operations in connection with the techniques depicted in FIGS. 1-6, according to various example embodiments, including, but not limited to, operations of the one or more endpoint devices such as endpoint device 180 of FIG. 1, EPs 210a-n of FIG. 2, or the first endpoint device 210a of FIGS. 3 and 4. Further the computing device 700 may be representative of the WLC 130, the authentication service 140, the network management service 150, or the UDN service 160 that are shown in FIG. 1. Further, the computing device 700 may be representative of the cloud-UDN 214, the authentication server 216, or the WLC 218 of FIGS. 2-4. It should be appreciated that FIG. 7 provides only an illustration of one example embodiment and does not imply any limitations with regard to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform various operations including obtaining, from the network interface, a registration request for establishing a user defined network (UDN) and generating a UDN identifier and a unique passcode associated with the UDN identifier. The unique passcode enables an authentication of one or more endpoint devices to connect to the UDN and the authentication is independent of a media access control (MAC) address of a respective endpoint device. The operations further include providing, to the network interface, the UDN identifier and the unique passcode such that the UDN identifier and the unique passcode are provided to the one or more endpoint devices to connect to the UDN.

In yet another example embodiment, an apparatus is provided. The apparatus includes a network interface configured to receive and send packets in a network and a processor. The processor is configured to perform various operations. The operations include obtaining, from an endpoint device, a unique passcode associated with a user defined network (UDN). The apparatus establishes a connection to a communication network for the endpoint device. The UDN is a portion of the communication network segmented for a user of the endpoint device. The operations further include generating a hash of the unique passcode and providing the hash to an authentication server. The authentication server authenticates the endpoint device onto the UDN based on the hash without using a media access control (MAC) address of the endpoint device. The operations further involve obtaining, from the authentication server, a UDN identifier associated with the hash and connecting the endpoint device to the UDN based on the UDN identifier.

In yet another example embodiment, one or more non-transitory computer readable storage media encoded with instructions are provided. When the media is executed by a processor, the instructions cause the processor to execute a method that involves obtaining a registration request for establishing a user defined network (UDN) and generating a UDN identifier and a unique passcode associated with the UDN identifier. The unique passcode enables an authentication of one or more endpoint devices to connect to the UDN. The authentication is independent of a media access control (MAC) address of a respective endpoint device. The method further involves providing the UDN identifier and the unique passcode such that the UDN identifier and the unique passcode are provided to the one or more endpoint devices to connect to the UDN.

In yet another example embodiment, one or more non-transitory computer readable storage media encoded with instructions are provided. When the media is executed by a processor, the instructions cause the processor to execute another method that involves obtaining, from an endpoint device, a unique passcode associated with a user defined network (UDN). A connection to a communication network is established for the endpoint deice. The UDN is a portion of the communication network segmented for a user of the endpoint device. The method further involves generating a hash of the unique passcode and providing the hash to an authentication server. The authentication server authenticates the endpoint device onto the UDN based on the hash without using a media access control (MAC) address of the endpoint device. The method further involves obtaining, from the authentication server, a UDN identifier associated with the hash and connecting the endpoint device to the UDN based on the UDN identifier.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
 obtaining, by a computing device, a registration request for establishing a user defined network (UDN), wherein the UDN is a network segment within a shared communication network that is dedicated to a user of a first endpoint device to which at least one second endpoint device is invited;
 generating, by the computing device, a unique UDN identifier and a unique passcode associated with the unique UDN identifier, wherein the unique passcode enables an authentication of a plurality of endpoint devices including the first endpoint device and the at least one second endpoint device, to connect to the UDN and the authentication is independent of a unique identity of a respective endpoint device;
 providing, by the computing device, the unique UDN identifier and the unique passcode such that the unique UDN identifier and the unique passcode are for connecting the plurality of endpoint devices to the UDN;
 obtaining a new unique identity of the respective endpoint device based on an identity rotation in which the unique identity of the respective endpoint device is changed to the new unique identity; and providing the new unique identity and the unique UDN identifier to update the unique identity associated with the respective endpoint device connected to the UDN.

2. The method of claim 1, wherein the registration request is obtained from a mobile application that is executing on the respective endpoint device of the plurality of endpoint devices, and
wherein the unique UDN identifier and the unique passcode are provided to the mobile application, which provisions the plurality of endpoint devices using a device provisioning protocol to connect to the UDN using the unique UDN identifier and the unique passcode.

3. The method of claim 2, wherein the unique identity of the respective endpoint device is a media access control (MAC) address and wherein the new unique identity is a new MAC address generated based on performing a MAC address rotation.

4. The method of claim 1, wherein the respective endpoint device is authenticated to connect to the UDN using the unique passcode instead of the unique identity.

5. The method of claim 1, further comprising:
generating, by the computing device, a hash of the unique passcode; and
providing, by the computing device to an authentication server, UDN information including the hash and the unique UDN identifier.

6. The method of claim 1, wherein generating the unique passcode involves generating a passphrase as a function of the unique UDN identifier.

7. The method of claim 1, wherein generating the unique passcode involves generating a pre-shared key as a function of the unique UDN identifier.

8. The method of claim 1, further comprising:
establishing a first connection with a wireless access network for the respective endpoint device, which is authenticated onto the wireless access network using a media access control (MAC) address of the respective endpoint device; and
establishing a second connection with the UDN, using the unique passcode instead of the MAC address.

9. The method of claim 8, wherein the second connection with the UDN is maintained without re-association with the UDN after the identity rotation.

10. A method comprising:
obtaining, by a network device from an endpoint device, a unique passcode associated with a user defined network (UDN), wherein the network device establishes a connection for the endpoint device to a communication network and wherein the UDN is a portion of the communication network segmented for a user of the endpoint device;
generating, by the network device, a hash of the unique passcode;
providing, by the network device, the hash, to an authentication server, wherein the authentication server authenticates the endpoint device onto the UDN based on the hash without using a unique identity of the endpoint device;
obtaining, by the network device from the authentication server, a unique UDN identifier associated with the hash;
connecting, by the network device, the endpoint device to the UDN based on the unique UDN identifier;
obtaining a new unique identity of the endpoint device based on the endpoint device performing an identity rotation in which the unique identity of the endpoint device is changed to the new unique identity; and
providing, to the authentication server, the new unique identity associated with the hash and a request to delete the unique identity associated with the hash to update the unique identity of the endpoint device associated with the UDN.

11. The method of claim 10, wherein the unique passcode and the unique UDN identifier are generated by a UDN service and wherein the hash of the unique passcode is associated with the unique UDN identifier and stored at the authentication server.

12. The method of claim 10, wherein providing the hash involves providing a Remote Authentication Dial-In User Service (RADIUS) message that includes the hash in a vendor payload.

13. The method of claim 12, wherein obtaining the unique UDN identifier involves obtaining a RADIUS message having the unique UDN identifier as one of a plurality of pre-defined RADIUS attributes, wherein the unique UDN identifier is matched with the hash by the authentication server.

14. The method of claim 10, wherein connecting the endpoint device to the UDN includes:
applying, by the network device, one or more traffic constraint policies associated with the UDN to one or more network packets obtained from the endpoint device.

15. The method of claim 10, wherein the unique passcode is a passphrase generated as a function of the unique UDN identifier.

16. The method of claim 10, wherein the unique passcode is a pre-shared key generated as a function of the unique UDN identifier.

17. An apparatus comprising:
a network interface to receive and send packets in a network; and
a processor, wherein the processor is configured to perform operations comprising:
obtaining, from the network interface, a registration request for establishing a user defined network (UDN), wherein the UDN is a network segment within a shared communication network that is dedicated to a user of the apparatus and to which at least one other endpoint device is invited;
generating a unique UDN identifier and a unique passcode associated with the unique UDN identifier, wherein the unique passcode enables an authentication of a plurality of endpoint devices to connect to the UDN and the authentication is independent of a unique identity of a respective endpoint device;
providing, to the network interface, the unique UDN identifier and the unique passcode such that the unique UDN identifier and the unique passcode are for connecting the plurality of endpoint devices to the UDN;
obtaining, from the network interface, a new unique identity of the respective endpoint device based on an identity rotation in which the unique identity of the respective endpoint device is changed to the new unique identity; and
providing the new unique identity and the unique UDN identifier to update the unique identity of the respective endpoint device connected to the UDN.

18. The apparatus of claim 17, wherein the registration request is obtained from a mobile application that is executing on the respective endpoint device, and wherein the unique UDN identifier and the unique passcode are provided to the mobile application, which provisions the plurality of endpoint devices using a device provisioning protocol to connect to the UDN using the unique UDN identifier and the unique passcode.

19. The apparatus of claim 18, wherein the unique identity of the respective endpoint device is a media access control (MAC) address and wherein the new unique identity is a new MAC address generated based on performing a MAC address rotation.

20. The apparatus of claim 17, wherein the respective endpoint device is authenticated to connect to the UDN using the unique passcode instead of the unique identity.

* * * * *